United States Patent [19]

Bloch et al.

[11] 4,297,466

[45] Oct. 27, 1981

[54] NOVEL ACRYLIC POLYMERS AND METHOD OF MAKING SAME

[75] Inventors: Bertrand Bloch, Paris; Chantal Cavalli born Meyer, Voisins le Bretonneux; Denis Charrier, Antony, all of France

[73] Assignee: Office National d'Etudes et de Recherches Aerospatiales, Chatillon sous Bagneux, France

[21] Appl. No.: 102,427

[22] Filed: Dec. 11, 1979

[30] Foreign Application Priority Data

Dec. 15, 1978 [FR] France .............................. 78 35459

[51] Int. Cl.³ .......................... C08F 6/00; C08F 14/18

[52] U.S. Cl. ................................. 526/218; 526/245; 528/503; 560/8

[58] Field of Search ..................... 526/245, 218, 326; 528/503

[56] References Cited

U.S. PATENT DOCUMENTS 2,571,687  10/1951  Dickey et al. .................... 526/245

*Primary Examiner*—Harry Wong, Jr.
*Attorney, Agent, or Firm*—Larson and Taylor

[57] ABSTRACT

The invention relates to poly(phenyl fluoracrylate) a novel polymer.

The polymer is useful for the manufacture of transparent materials with very high heat stability.

15 Claims, 1 Drawing Figure

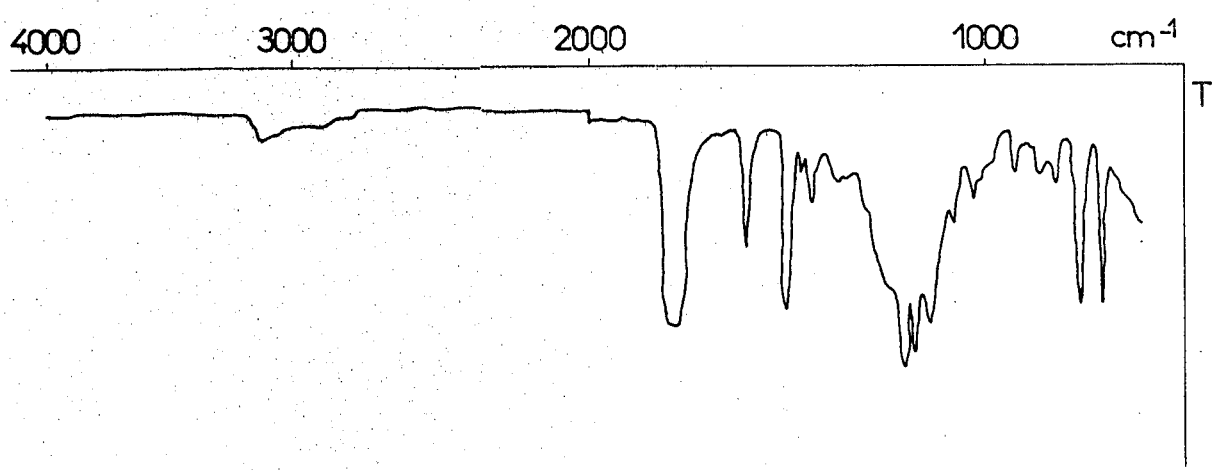

NOVEL ACRYLIC POLYMERS AND METHOD OF MAKING SAME

The invention relates to novel acrylic polymers, their preparation and their applications, in particular, as transparent organic materials.

It is known that, generally, acrylic polymers, and more especially polyacrylates, possess valuable optical and mechanical properties, and are used as organic glasses in industry.

The most interesting polyacrylate in this respect and the most widely used in polymethylmethacrylate or (PMMA).

However, PMMA is not useful in practice beyond 90° C., like the majority of polyacrylates known to this day, by reason of its softening point, which is, for this product, 95° C.

These acrylic materials are not sufficiently satisfactory with respect to the ever more drastic requirements of industry, in particular of the aeronautical industry and more especially in the field of supersonic aircraft which require transparent materials with a high heat stability.

The search for thermostable materials has permitted the development of chlorinated polyacrylates having important optical and mechanical properties at temperatures of the order of 135°–140° C., such as poly(methyl 2-chloro-acrylate), but the high cost price of these materials constitutes an obstacle to their manufacture on an industrial scale.

It is a particular object of the invention to provide novel polymers responding better than those known until now to the exigencies of technology, in particular, to the needs of supersonic aircraft from the point of view of both mechanical and optical properties and especially the preservation of these properties at temperatures above 140° C.

It is also an object to provide a process for the manufacture of these polymers which is easy to apply, and industrially exploitable.

The materials according to the invention are characterized by the fact that they are constituted by a polymer whose monomer unit may be represented by the formula

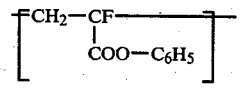

It is obtained by polymerization of phenyl fluoroacrylate, of the formula $CH_2=CF—COO—C_6H_5$.

The polymer of the invention hence forms essentially a polyphenylfluoroacrylate (denoted below by the abbreviation PPFa).

The polymer according to the invention can also be characterized by an absorption spectrum in the infrared, which has the essential characteristics of that which is shown in the single FIGURE of the drawing.

The molecular weights obtained, such as a result from the study of the polymerization kinetics, are normally higher than 1,000,000. They can reach several million, which confers on them excellent thermomechanical properties, when resorting to the manufacturing techniques which will be described below.

The polymers according to the invention are transparent and colorless solids at ambient temperature. They are characterized by a high softening point (Tr) which can reach, according to one aspect of the invention of great interest, values close to 170° C.

For the preparation of these polymers, phenyl fluoroacrylate is subjected to a polymerization process, more especially of radical polymerization process.

According to an advantageous additional feature, in order to increase the softening point of the polymers, the polymerization reaction is completed by a heat treatment or annealing.

According to yet other features, in order to eliminate at least the major part of polymerization inhibiting factors, the monomer is previously purified and the reaction system is protected against the oxygen of the air.

In general, polymerization is carried out according to conventional bulk polymerization techniques by the radical polymerization mechanism.

The kinetics of this polymerization reaction have been studied by the inventors using dilatometry (measurement of the variations in volume in the course of polymerization) and infrared spectrography (the chemical transformation resulting from the polymerization being manifested in particular by the disappearance of certain bands characteristic of double bonds).

This study shows the great reactivity of phenyl fluoroacrylate monomer in comparison with the usual monomers as well as an unusual behavior with respect to temperature, rendering possible the production of molecular weights which are all the higher as the polymerizing temperature is lower.

Also, in order to obtain high molecular weights, it is desirable to carry out the polymerization at a temperature as moderate as possible, compatible with reasonable polymerization kinetics.

A temperature range of the order of 20° to 50° C., preferably of the order of 30° to 40° C., is found to be suitable for satisfactory polymerization, which can then proceed for some hours, and more especially for about 10 to 15 hours.

Molecular weights of several millions and, more especially, of the order of $3 \times 10^6$ to $6 \times 10^6$ can be reached, subject to the absence of important transfer and termination phenomena of the chains by dismutation.

The very rapid production of these high molecular weights results in gelification of the medium which can be observed from a conversion ratio of monomer to polymer of the order of only 10%.

Beyond this conversion level, as is shown by study of the polymerization reaction by infrared spectrometry, an increase in the speed of polymerization is noted which corresponds to the phenomena known under the term auto-acceleration by gel effect.

However, the gelled medium becomes more and more rigid progressively as the polymerization advances. Accordingly, the reaction risks becoming blocked at a certain degree of conversion less than 100%, in which case the softening point would be too low. It is hence advantageous to provide, at the end of the process, an increase in the temperature, continuously or in steps, and to terminate the operation by an annealing treatment at a temperature close to the temperature contemplated for the use of the material.

In a polymerization process applied in the preferred range of temperature indicated above of the order of 20° to 45° C., the reaction system is then brought to temperatures of about 50° to 80° C.

To initiate polymerization, at least one initiator is applied, selected from among systems active at the temperatures used.

To initiate polymerization at low temperature, an initiator is advantageously resorted to such as azo-bis-iso-butyronitrile or AIBN or benzoyl peroxide.

The concentration of the initiator is selected so as to facilitate the development of the kinetics of the polymerization.

At the low temperature ranges advantageously used, it is preferable to apply amounts of initiator less than 0.1% and preferably of the order of 0.01 to 0.05% by weight with respect to the weight of monomer. Experience shows, in accordance with theory, that the molecular weight of the polymers obtained diminish with the concentration of initiator, whilst remaining at an extremely high level by operating under the above-defined conditions.

The polymer obtained at the end of this polymerization process constitutes a material having optical properties, in particular a transparency and absence of color, which is extremely satisfactory.

In view of the desired application at high temperature and, more especially, at temperatures above 120° C., the polymer resulting from the radical polymerization described above is subjected, if necessary, to a heat treatment or annealing, notably at a temperature at about 120° to about 180° C., preferably of the order of 150° C., in order to increase the thermo-mechanical stability of the polymer.

This annealing operation constitutes advantageously a polymerization complement and permits the reaction to be pursued if necessary until its limit and at a speed which can be very rapid if the processing temperature is high enough.

By annealing, it is observed that the softening point of the polymers of the invention is raised to temperatures above 140° C. and up to 150°–180° C.

The speed of elevation of the softening point is all the greater as the temperature at which the operation is carried out is higher. The values of softening point indicated above are thus obtained in about 1 hour by operating at temperatures of the order of 150° to 180° C.

Experiments show that progressive rise of temperature up to the values indicated above, which are held then for about 30 minutes, provides a satisfactory annealing operation.

To facilitate the initiation of polymerization during annealing, recourse may be had to an initiator active at high temperatures. Such an initiator is then advantageously provided in the starting reaction mixture which includes also, as already indicated, a low temperature initiator. A high temperature initiator, such as ditertiarybutyl peroxide is found to be suitable. The concentration of this initiator is advantageously at least 0.01 and preferably of the order of 0.01 to 0.05% by weight with respect to the monomer.

The production of polymers possessing valuable optical properties and endowed with a softening point as high as about 170° C. renders possible the use of these polymers at very high temperatures, which corresponds, in particular, to the requirements of supersonic aircraft constructors.

To improve the yield and properties of the polymer, the operations of polymerization and of annealing are carried out advantageously in such a manner as to eliminate the largest part possible of the impurities of the reaction system.

It is known that, generally, the impurities constitute polymerization inhibitors which result notably in a limitation of the chain length in the course of polymerization and, through this, an arrest of polymerization, or that the impurities neutralize the reactivity of the polymerization initiating radicals. Their presence in the reaction system, that is to say either in the monomer, or in the equipment utilized for polymerization, or in the reaction mixture leads to the production of low molecular weights and to polymers whose mechanical properties are not satisfactory.

More particularly, the impurities appear to be generators of coloration, which constitutes a considerable drawback for the applications of the polymers as organic glasses.

The study of the possibilities of improving the optical and thermo-mechanical properties and of the colorless character of the polymers of the invention has lead the inventors to observe the particularly important role of the purity of the monomoer in this respect.

In accordance with the invention, there is utilized, in the polymerization process, phenyl fluoroacrylate possessing a high degree of purity.

Advantageously, the fluoroacrylate concerned is obtained according to the features provided in our co-pending patent application Ser. No. 102,389 filed Dec. 11, 1979 for "Process for Making an Acrylic Monomer".

In accordance with the features of that patent application, phenyl fluoroacrylate is prepared advantageously from a salt of fluoroacrylic acid of the formula $CH_2=CF-COOM$, in which M represents a metallic cation, more especially sodium. This salt is then subjected to the action of a halogenating agent, more particularly a chlorinating agent such as thionyl chloride, and the fluoroacryloyl chloride resulting, formed as an intermediate product, is condensed with phenol.

According to an additional feature of that patent application, the salt of fluoroacrylic acid utilized is obtained from an alkyl ester of fluoroacetic acid of the formula $FCH_2-COOR$ in which R represents an alkyl radical. In the particularly preferred case where sodium fluoroacrylate is used, it is advantageously prepared from ethyl fluoroacetate.

The process thus comprises:

in a first phase known in itself, reacting in the presence of a base and more particularly an alcoholate $M_1OR$ where $M_1$ represents preferably an alkali metal, of the fluoroacetic ester, indicated above, more especially of ethyl fluoroacetate, with an alkyl ester of oxalic acid of the formula $RO-CO-CO-OR$, in which R is an alkyl radical, identical or different from that of the fluoroacetic ester, the oxalic ester being preferably ethyl oxalate;

in a second phase, known in itself, the addition, preferably at a temperature not exceeding about 50° C., of formol or of a precursor compound of the latter, such as paraformaldehyde with oxalofluoroacetic enolate obtained of formula $RO-CO-C(OM_1)=C(F-)CO-OR$, in which R has the meaning already given, and $M_1$ is a metallic cation coming from the base used in the first phase; and, according to an advantageous feature of the invention, in a third phase, saponification, with a strong base, of the reaction mixture which permits the salt of the desired fluoroacrylic acid to be available without having to isolate the intermediate alkyl fluoroacrylate.

The crude product thus obtained is then advantageously subjected, in accordance with the present invention, to at least one purification treatment.

Particularly efficient treatments include chromatography on a column and distillation, more especially fractional distillation, of the monomer.

The production of products of high purity may also be effected by fractional recrystallization.

The inventors have, in fact, observed that the monomer of phenyl fluoroacrylate crystallizes at a temperature which is of the order of $+4°$ C. This crystallization occurs very slowly, and it is possible to accelerate the process, for example by means of seeds or by intense cooling.

The utilization of several purification methods enables the degree of purity of the monomer to be considerably improved.

In particular, it is advantageous to resort successively to at least one fractional distillation operation and to at least one fractional recrystallization operation.

The fractional distillation is carried out advantageously on a plate column until the production of a monomer having a degree of purity of at least 98%. To this end, it is particularly effective to resort to a column of about 10 plates.

Following of the purification treatment by at least one fractional recrystallization, with the removal at each repetition of the mother liquors, enables a purity of close to 100% to be reached in practice.

In particular, the thus purified fluoroacrylate no longer includes phenol detectable by liquid phase chromatography and is found to be practically devoid of phenyl fluoroacetate except possibly for trace amounts.

According to a supplementary feature, in order to improve still more especially the optical and mechanical properties of the polymers of the invention, the reaction system is advantageously protected against the ingress of impurities, in particular, of atmospheric oxygen, whose considerable effect as a radical polymerization inhibitor is known particularly in the field of acrylic derivatives.

To this end, the operation is carried out protected from air, for example, under an inert atmosphere.

In addition, prior degassification of the reaction system contributes to reinforcing the protection against the action of oxygen and enables the polymerization induction time resulting from the presence of dissolved oxygen to be limited.

To this end, the mixture of monomer and initiator is advantageously subjected to a cryodegassification operation, prior to polymerization. According to this operation, which is based on the considerable lowering of the solubility of gases in liquid when the latter are frozen, a succession of solidifications and liquefactions of the mixture, under high vacuum, are carried out.

The application of the various features mentioned above, and more especially the carrying out of the polymerization process completed by the heat treatment as well as the protection of the reaction system against impurities, enables a polymeric material of high quality to be obtained.

As is shown by the results of comparative tests given in the examples, there are found in the polymers of invention, the mechanical and optical properties of the acrylic transparent materials presently used in the aeronautics industry. However according to an aspect of considerable interest, the polymers of the invention possess a superior thermo-mechanical stability, conferring upon them possibilities of application in fields with extremely severe requirements. They may thus be used notably in supersonic aeronautics, for the construction of windows or canopies.

Other characteristics and advantages of the invention will appear in the description of the examples which follow.

EXAMPLE I—Preparation of phenyl fluoroacrylate monomer of the formula $CH_2=CF-COO-C_6H_5$ This monomer is prepared from sodium fluoroacrylate $CH_2=CF-COONa$, itself obtained from ethyl fluoroacetate $FCH_2-COOC_2H_5$.

a—Preparation of sodium fluoroacrylate

First a suspension of 76.8 g 1.13 mole) of sodium ethylate in 360 ml of tetrahydrofurane (THF), is prepared. The ethylate prepared by the action, on a stoichiometric amount of alcohol, of metallic sodium or sodium hydride (which permits coloration of the sodium fluoroacrylate to be reduced) is used. Alternatively, the commercial product may be used. By operating at ambient temperature, there are then added slowly 146 g (1 mole) of ethyl oxalate, and then, following this 106 g (1 mole) of ethyl fluoroacetate.

The solution obtained is left standing for 16 hours at room temperature. In this solution, at first clear, a precipitate of sodium enolate of oxalofluoroacetic ester is formed 
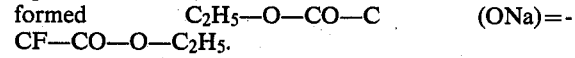
$C_2H_5-O-CO-C(ONa)=CF-CO-O-C_2H_5$.

According to a modification, the solution is heated for 2 hours at about 50° C.

There is then added to the suspension formed, stirring well and at about 0° C., 45 g (1.5 mole) of paraformaldehyde. This addition is carried out rapidly in a single stage, the temperature rising spontaneously up to about 40° C., and the mixture gelling in some minutes. The temperature is kept at 40° to 50° C. for a half hour.

After cooling, the mixture is fluidified, by means of 600 ml of water containing about 0.5 g of hydroquinone as polymerization inhibitor or, preferably, monomethyl ether of hydroquinone which enables a practically colorless final product to be obtained. It is then treated with 666 ml of 3 N aqueous NaOH added little by little. During the latter treatment which is exothermic, the temperature is kept at a maximum of 25° C. by means of an ice bath. The sodium oxalate formed in the course of this saponification reaction is filtered and then the sodium fluoroacrylate is isolated by extended evaporation of the solution, under vaccum and at 50° C. The residue is washed with alcohol and with acetone, and finally dried under vaccum at about 50° C. Yield 81%. Elementary analysis in % by weight: C calc. 32.1, found 32.25; H calc. 1.8, found 1.71. Ratio of double bonds: calc. 100, found 96.4.

b—Preparation of phenyl fluoroacrylate 100 g (0.88 mole) of sodium fluoroacrylate are dispersed in 380 ml of benzene in the presence of 10 ml of dimethylformamide (DMF). 64.5 ml (0.9 mole) of thionyl chloride ($SOCl_2$) are added, and then the mixture is heated under reflux for 30 minutes. The fluoroacryloyl chloride which is formed is not isolated, and is immediately treated in the cold by resorting to an ice bath, with 84.5 g (0.9 mole) of phenol in the presence, as a hydrochloric acid acceptor base, of 125 ml (0.9 mole) of triethylamine.

The mixture obtained is washed with 800 ml of water, to eliminate all the salts formed (sodium and triethylammonium chlorides), and then, successively, with a solution of 52 ml of 1 N hydrochloric acid in 100 ml of water, and a solution of 105 ml of 3 N soda in 100 ml of water (in order to remove the unreacted amounts of reactants) and finally, with water, until neutrality of the aqueous phase is reached.

After evaporation of the organic phase and then rapid distillation, 110 g (0.65 mole) of crude phenyl fluoroacrylate are obtained, namely a yield of 60.3% calculated with respect to the ethyl fluoroacetate which was used for the preparation of the sodium fluoroacrylate. The phenyl fluoroacrylate obtained is in the form of a liquid product possessing a boiling point of 40° C. under 26.66 Pascal.

EXAMPLE II—Purification of the phenyl fluoroacrylate monomer by fractional distillation of the crude product, followed by fractional recrystallization.

A monomer derived directly from a process of synthesis as described in Example I is used.

a—Fractional distillation

The distillation is carried out on a column with 10 plates at a temperature of the order of 40° C. under 0.25 mm of Hg (the temperature of the flask can however reach 120°-140° C. at the end of the operation) in the presence of monomethyl ether of hydroquinone as polymerization inhibitor and protected from too strong a light.

At the head there generally passes a more or less yellow colored liquid, and then the fractions become more and more colorless, without the temperature varying substantially. Fractionation is hence carried out according, not to the temperature, but to the color.

Two fractions are collected whose quantitative analyses are indicated in the following Table I (these analyses are carried out by the adjunction of an integrator-calculator, such as that marketed by LTT under the name ICAP5, to a liquid phase chromatograph such as that marketed by Waters Associated under the name ALC/GPC 501. The product is injected as is, or diluted to 100 mg/ml, the dilution solvent being identical with the elution solvent and constituted by a hexane/tetrahydrofurane=99/1 mixture. For filling the column, the product marketed by Waters Associates under the trademark DURAPAK and which corresponds to the product marketed under the trademark CARBOWAX 400 grafted on silica, is used.

The calibrations are carried out by means of pure phenyl and fluoroacetate, diluted in known manner.

TABLE I

| Distillation Fraction | Amount (g) | % by weight of monomer | % by weight of phenyl fluoroacetate | % by weight of phenyl |
|---|---|---|---|---|
| 1 | 12.5 | 73.47 | 0 | 26.53 |
| 2 | 162 | 100* | 0 | 0* |
|   |   | 99.18** | 0 | 0.82** |

*Analysis of the fraction diluted to 100 mg/ml in hexane/THF = 99/1
**Analysis of the crude fraction.

The results obtained show the high efficiency of this method which enables a completely colorless monomer to be obtained.

b—Fractional recrystallization

Collected below are the results obtained in recrystallizing a monomer already purified by fractional distillation on a 10 plate column as previously described.

The property of the monomer to crystallize at +4° C. is used and then one proceeds according to the following general technique.

The monomer is placed in a tube, cooled to about −20° C. by dipping it into a bath constituted by a mixture of liquid nitrogen and trichloroethylene. Air is allowed to bubble through the mixture in the course of crystallizing for about 90 minutes, the temperature of the outer bath being then about −10° C. In a second stage, the non-crystallized fraction is filtered off, the bath temperature being −5° C. at the end of filtration.

The results obtained after a series of fractional recrystallizations are indicated in Table II below:

TABLE II

| Product Analyzed | Amount (g) | % by weight of monomer | % by weight of phenyl fluoroacetate | % by weight of phenol |
|---|---|---|---|---|
| Starting product | 197.5 | 98.39 | 0.67 | 0.94 |
| Product of 1st recrystallization | 133 | 99.82 | 0 | 0.17 |
| Product of 2nd recrystallization | 126 | 100 | 0 | 0 |

Examination of these results shows that from the first recrystallization, the phenyl fluoroacetate is entirely eliminated and phenol is no longer detected on the second recrystallization.

The association of this recrystallization operation with another method of purification therefore has the advantage of leading to monomeric products of very great purity.

EXAMPLE III—Manufacture of polyphenylfluoracrylate or PPFA by polymerization of phenyl fluoroacrylate.

A device comprising a tube of about 10 mm diameter connectable by a circular ramp to a vaccum or nitrogen circuit is used.

The monomer used is phenyl fluoroacrylate, previously kept cold, in the crystalline state, in the absence of polymerization inhibitor and containing less than 0.1% of impurities. Into the tube about 8 g of liquid monomer and 0.02% AIBN is introduced.

A first cryodegassing operation is carried out simultaneously on the sample by crystallization in liquid nitrogen and then melting under vaccum, and this is followed by two other cryodegassing operations.

After returning to ambient temperature, the tubes are purged by draining and repeated introduction of nitrogen.

The tube is then closed and then it is plunged for about 14 hours into a bath, controlled by thermostat at 35° C. for polymerization. After about 5 hours, gelling of the reaction mass is observed which becomes almost entirely solid after heating for about 14 hours.

The temperature is then gradually brought over 4 hours to 60° C. and held for about 1 hour. The sample is then completely solid, entirely colorless and transparent.

The annealing phase then follows operating under nitorgen and raising the temperature by 2° C./min up to 180° C. and then holding it at this value for 30 minutes.

The softening point (Tr) is measured by penetrometry using as thermo-mechanical analyzer, a device marketed under the designation 941 by Du Pont de Nemours.

To carry out these measurements, the penetration probe of the analyzer is charged with 20 g of polymer, the speed of rise of temperature being 20° C./min. The softening point is marked at the intersection of the tangents to the curve framing the softening phenomena.

By way of comparison, there is measured, by operating under the same conditions, the Tr (a) of the polymethylmethacrylate (PMMA) marketed by Rohm and Haas under the trademark OROGLASS 55 and which is employed at present in aeronautical construction and (b) of a bisphenol-A polycarbonate marketed under the trademark LEXAN by General Electric, whose use in aeronautics is contemplated by reason of its heat resistance and higher impact resistance than that of the PMMA.

The measurements obtained are indicated in the following Table III:

TABLE III

| Polymer | Tr |
|---|---|
| PPFA | 170° C. |
| OROGLASS | 100° C. |
| LEXAN | 133° C. |

Examination of these results shows the distinct superiority of the polymers of the invention as regards the value of the softening point in particular.

The polymers of the invention have been studied from the point of view of their mechanical and optical properties. Below are reported the results relating to this study.

In the following, by PPFA I and PPFA II are denoted the polymers of the invention as obtained according to the operational method described above in which the annealing was done respectively at 150° and 180° C.

By way of comparison, the results obtained with materials of the prior art such as OROGLASS 55 and LEXAN as well as another polycarbonate of bisphenol A marketed under the trademark MAKROLON by BAYER, are indicated.

a—Mechanical properties

The properties measured are those which are accessible from specimens machined in cylindrical samples manufactured according to the previously described process.

1—Properties under traction

The test samples were turned so as to form at each end a double shoulder which permits ruptures spaced from the heads to be obtained.

By way of comparison, OROGLASS and MAKROLON test samples were machined from flat commercial plates.

Three series of tests were carried out, namely at room temperature, at 80° and at 140° C. and this, on a Zwick tensile machine with a speed of elongation of 0.5 mm/min. The stress-strain curves, translating a conventional behavior for plastics materials, enable the calculation of the tensile strength (calculated from the maximum load applied before breakage), and of the breaking elongation.

The values indicated in Table IV which follows, have been calculated from 4 to 5 tests per material, at ambient temperature. In Table V, are given the results of tests carried out at 80° and 140° C. (one test per material and per temperature).

TABLE IV

| Material | Tensile Strength (MPa) | Breaking Elongation (%) |
|---|---|---|
| PPFA I | 82.8–87.5 | 2.25–2.75 |
| PPFA II | 82.8–85.9 | 2.25–5.75 |
| OROGLASS 55 | 76.5–79.7 | 2.5–7.5 |
| MAKROLON | 64.8–66.4 | 26–105 |

TABLE V

| Material | Tensile Strength (MPa) 80° C. | Tensile Strength (MPa) 140° C. | Breaking Elongation (%) 80° C. | Breaking Elongation (%) 140° C. |
|---|---|---|---|---|
| PPFA I | 47 | 17.6 | 5 | 125 |
| PPFA II | (a) | 18.7 | (a) | 49 |
| OROGLASS 55 | 30.5 | (b) | 21 | (b) |
| MAKROLON | 42.9 | (b) | 145 | (b) |

(a) not measured
(b) tests pointless, the materials being above their softening temperature.

Examination of these tables shows that the strength of PPFA is slightly greater than that of the polymers of the prior art at ambient temperature, the difference more marked at 80° C. It is observed that they preserve useful properties at 140° C., a temperature which is beyond the limit of usefulness of the two other polymers.

Also observed are the high values of the breaking elongation obtained even at 140° C. with the polymers of the invention, which enables thermo-forming operations to be contemplated.

All of the results obtained as regards the polymers of the invention show that they do not have very marked differences at the level of the properties studied. The annealing temperature at 150° or 180° C. hence does not appear to be really critical.

2—Impact strength

The test carried out is that of the notchless Charpy type, performed by means of a WOLPERT pendulum, type CPSA. The test specimens are parallelepipeds with a square base of dimensions 3×3×47 mm, the distance between the supports being 40 mm. The values given in the Table VI below are the averages calculated from five tests per material with PPFA I, PPFA II and OROGLASS 55.

TABLE VI

| Specimen | Impact Strength (J/m$^2$) |
|---|---|
| PPFA I | 13.7 · 10$^3$ |
| PPFA II | 13.3 · 10$^3$ |
| OROGLASS 55 | 14.1 · 10$^3$ |

It is observed that the polymers of the invention, under the test conditions, possess an impact strength very little inferior to that of OROGLASS.

b—Optical properties

Study of transmission in the visible spectrum

The optical transmissions were determined from the spectral transmission curves, obtained by means of a spectrophotometer (Perkin-Elmer).

The samples were tablets of 8 mm thickness, cut out from the cylindrical specimens trued to a diameter of 10 mm, and carefully polished on their two parallel surfaces. They were placed in position in the apparatus by means of the metallic cover adjusted precisely to their diameter. The values given are the averages of the transmissions measured at 10 wave lengths in the visible range, called "luminous coordinates" (4894, 5151, 5298, 5414, 5619, 5725, 5848, 6008 and 6273 Å) by the method employed in the Societe Saint Gobain Industries (Sully Produits Speciaux).

In Table VII which follows, the results obtained with two polymers of the invention are reported, these polymers having been prepared by means of a single initiator, namely AIBN (0.02%):

A: polymer which has undergone annealing at 150° C.; Tr=156° C.,
B: polymer which has undergone annealing at 180° C.; Tr=172° C.

Within the scope of these tests, two polymers of the prior art were also studied, namely OROGLASS 55 and LEXAN.

TABLE VII

| Material | Average transmission |
|---|---|
| A | 90.4% |
| B | 90.1–90.2% |
| OROGLASS 55 | 91.2% |
| LEXAN (a) | 80.7% |

(a) Thickness 6 mm.

It is observed, on examining this table, that the transmission in the visible range of PPFA of the invention is almost equivalent to that of OROGLASS and very close to the theoretical value for a perfectly colorless and transparent material, taking into account losses by reflection on the surfaces.

Refractive index $n_D^{20} = 1.32$.

We claim:

1. An acrylic polymer comprising recurring units of the formula:

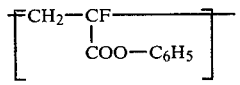

2. An acrylic polymer comprising recurring units of the formula:

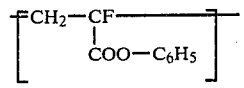

said polymer having a softening point exceeding 140° C.

3. A polymer according to claim 2 wherein said softening point is from 140°–170° C.

4. Polyphenyl-alpha-fluoroacrylate.

5. Process for the preparation of an acrylic polymer comprising recurring units of the formula:

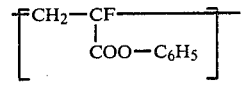

comprising subjecting phenyl fluoroacrylate to a free radical polymerization process.

6. Process according to claim 5, wherein polymerization is carried out at temperatures of the order of 20° to 50° C.

7. Process according to claims 5 or 6, wherein at least one initiator is used, selected from among those active at the reaction temperatures used.

8. Process according to claim 7, wherein the polymerization is carried out in the presence of azo-bis-isobutyronitrile, as a low temperature initiator.

9. Process according to claim 7 wherein the initiator is present in an amount of at least 0.01% by weight approximately with respect to the weight of monomer.

10. Process according to claim 5, further comprising annealing the polymerization product at temperatures of about 120°–180° C.

11. Process according to claim 10, wherein the annealing is carried out by gradually increasing the temperature, and then holding the temperature constant for about 30 minutes.

12. Process according to claim 5 wherein said polymerization process comprises a bulk polymerization process.

13. Process according to claim 6 wherein, at the end of polymerization, temperature is increased to about 50°–80° C.

14. Process according to claim 9 wherein the amount of initiator is about 0.01 to 0.05% by weight based on the weight of monomer.

15. Process according to claim 10 wherein said temperature is about 150° C.

* * * * *